United States Patent
Pugh

(10) Patent No.: US 8,046,981 B2
(45) Date of Patent: *Nov. 1, 2011

(54) ROTARY TOOL FOR SPREADING PARTICULATE MATERIALS AND METHOD OF USING THE SAME

(75) Inventor: Todd E. Pugh, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,838

(22) Filed: Jan. 22, 2010

(65) Prior Publication Data

US 2010/0116899 A1 May 13, 2010

Related U.S. Application Data

(60) Division of application No. 11/968,373, filed on Jan. 2, 2008, now abandoned, which is a continuation of application No. 10/933,142, filed on Sep. 2, 2004, now Pat. No. 7,325,755.

(51) Int. Cl.
  *A01D 19/00* (2006.01)
(52) U.S. Cl. ......... 56/17.5; 239/650; 239/663; 239/289; 37/244; 56/12.7
(58) Field of Classification Search ............. 239/289, 239/650, 663; 37/259, 244, 223, 238, 403; 404/112, 113, 97, 101; 172/13, 14, 21, 25; 460/111; 56/17.5, 12.7
See application file for complete search history.

(56) References Cited

U.S. PATENT DOCUMENTS

| | | | |
|---|---|---|---|
| 1,692,617 A | 11/1928 | Spencer | |
| 3,208,209 A | 9/1965 | Dunlap et al. | |
| 3,638,917 A | 2/1972 | Osten | |
| 3,708,967 A * | 1/1973 | Geist et al. ..................... | 56/12.7 |
| 4,054,992 A * | 10/1977 | Ballas et al. .................... | 30/276 |
| 4,062,114 A * | 12/1977 | Luick .............................. | 30/276 |
| 4,190,954 A | 3/1980 | Walto | |
| 4,404,706 A | 9/1983 | Loyd | |
| 4,461,138 A | 7/1984 | Whitman | |
| 4,911,247 A | 3/1990 | Kuhlmann et al. | |
| 4,928,457 A | 5/1990 | Laperle | |
| 4,936,884 A | 6/1990 | Campbell | |
| 5,048,278 A | 9/1991 | Jones et al. | |
| 5,340,030 A | 8/1994 | Siegrist, Jr. | |
| 5,522,162 A | 6/1996 | Allison | |
| 5,615,543 A * | 4/1997 | Caffey et al. ................... | 56/295 |
| 5,768,867 A | 6/1998 | Carlsen | |
| 5,890,352 A | 4/1999 | Molina | |
| 6,536,535 B1 | 3/2003 | Washek | |
| 6,631,770 B2 | 10/2003 | Guard et al. | |
| 7,325,755 B2 * | 2/2008 | Pugh ............................. | 239/650 |

* cited by examiner

*Primary Examiner* — Dinh Nguyen
(74) *Attorney, Agent, or Firm* — Sand & Sebolt

(57) ABSTRACT

A rotary tool for spreading mulch outwardly from a mound of the same. The tool has an elongated shaft with a rotatable body mounted proximate a first end thereof. The body has a peripheral edge with a plurality of flexible fingers radiating outwardly and downwardly therefrom. The fingers may be individually securable to the body. In a second embodiment, a ring is detachably mounted to the body and the fingers are on the ring. When the tool is activated, the fingers engage the mulch mound and cause pieces of mulch to be flicked outwardly away from the body. The tool may also be used as a shovel-type device when the motor is not activated and the mulch can then be carried on the upper surface of the body.

6 Claims, 11 Drawing Sheets

ROTARY TOOL FOR SPREADING PARTICULATE MATERIALS AND METHOD OF USING THE SAME

CROSS-REFERENCE TO RELATED APPLICATIONS

This is a divisional of U.S. patent application Ser. No. 11/968,373, filed Jan. 2, 2008, which is a Continuation of U.S. patent application Ser. No. 10/933,142, filed Sep. 2, 2004, now U.S. Pat. No. 7,325,755, the entire disclosures of which are incorporated herein by reference.

BACKGROUND OF THE INVENTION

1. Technical Field

This invention generally relates to rotary tools. More particularly, the invention relates to a rotary tool for spreading particulate materials. Specifically, the invention relates to a rotary tool which includes a rotatable body with a plurality of fingers radiating outwardly therefrom.

2. Background Information

In landscaping, it is common to apply particulate materials such as mulch to flowerbeds to reduce weed growth, retain moisture in the soil and improve the aesthetic appearance of the flowerbed. Commonly used mulch particulate materials include leaves, bark chips and shredded wood. These materials are usually delivered by wheelbarrow or bag to the flowerbed and the gardener then spreads the particulate materials around the plants using a rake. Spreading and leveling a particulate materials mound is both time consuming and laborious because of the physical nature of these types of materials and their tendency to stick together in clumps. This is especially true for employees of landscaping services who may have to particulate materials a large number of flowerbeds for numerous clients in a fairly short time span. It is also possible that a gardener will wish to distribute other types of particulate materials, such as gravel or stones, over the ground surface within a flower bed. These particulate materials are equally difficult to distribute over the surface.

There is therefore a need in the art for a device that assists the gardener to spread particulate materials, such as mulch, gravel or stone, around a flowerbed and which particularly assists in distributing the particulate materials from an initially formed mound of the same.

SUMMARY OF THE INVENTION

The rotary tool of the present invention includes a rotatable body that has an upper surface and a center axis therein. A stationary coupler is coaxial with the center axis of the rotatable body and receives a powered drive shaft therein. When the drive shaft is activated it causes the rotatable body to rotate about the center axis. The rotatable body also includes a peripheral edge for engaging the particulate materials. The peripheral edge may include a plurality of fingers that extend outwardly therefrom. The rotary tool may be rotated in a clockwise or anticlockwise direction, or the rotation may be of an oscillating nature where the rotatable body alternates between a clockwise and anticlockwise direction. As the rotatable body rotates, the fingers engage the particulate material and cause individual particulate materials to be flicked outwardly away from the rotating body.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
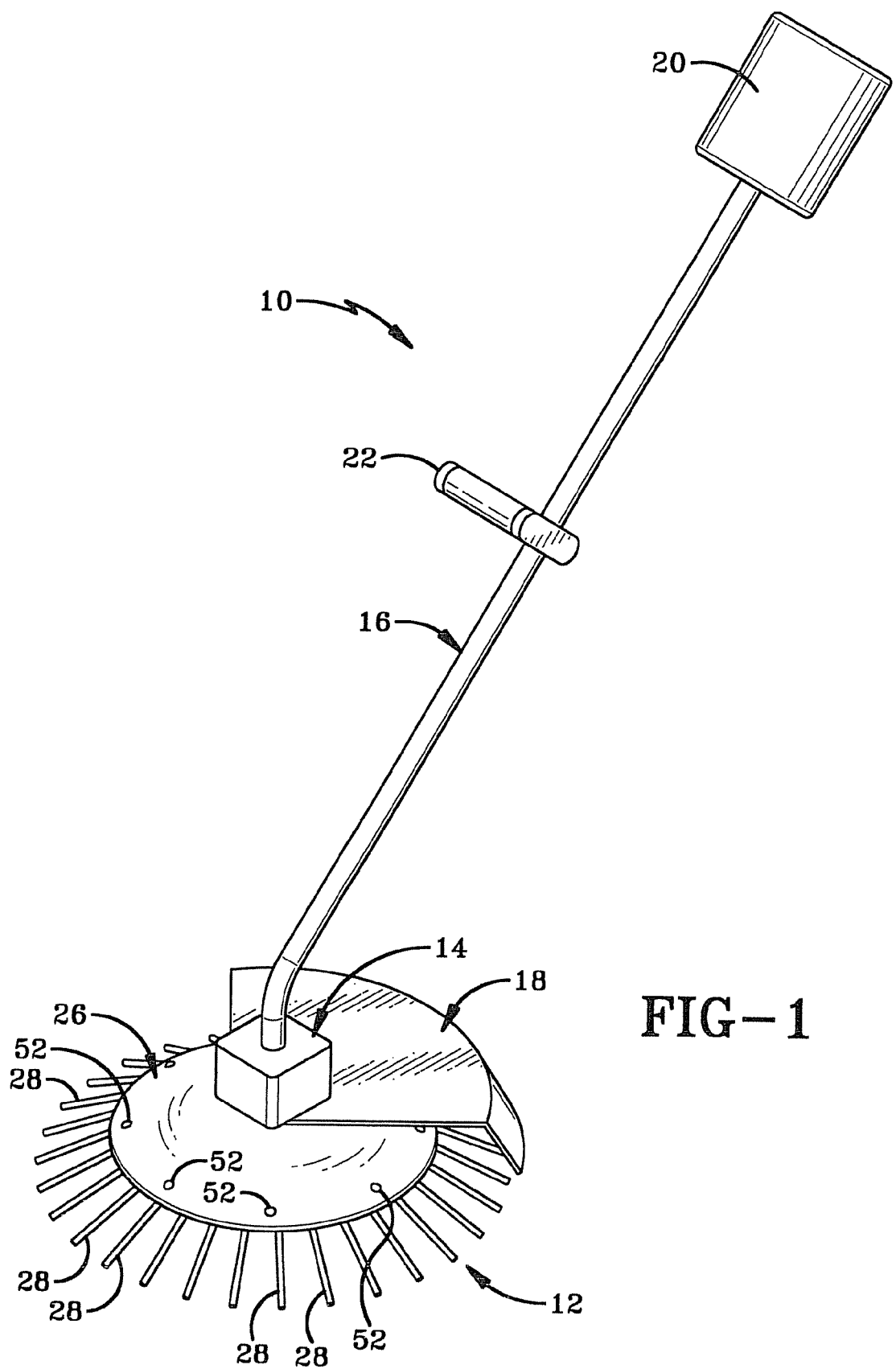
FIG. 1 is a perspective view of a rotary tool in accordance with the present invention.

Referring to FIG. 1, there is shown a rotary tool in accordance with the present invention and generally indicated at 10. Tool 10 includes a rotatable body or spreader, generally indicated at 12, mounted via a stationary coupler 14 to one end of a shaft 16. Rotatable body 12 is partially covered by a hood 18 to protect the operator from flying debris. A motor 20 is mounted on the other end of shaft 16 and a handle 22 is provided for holding tool 10.

Figure 2:
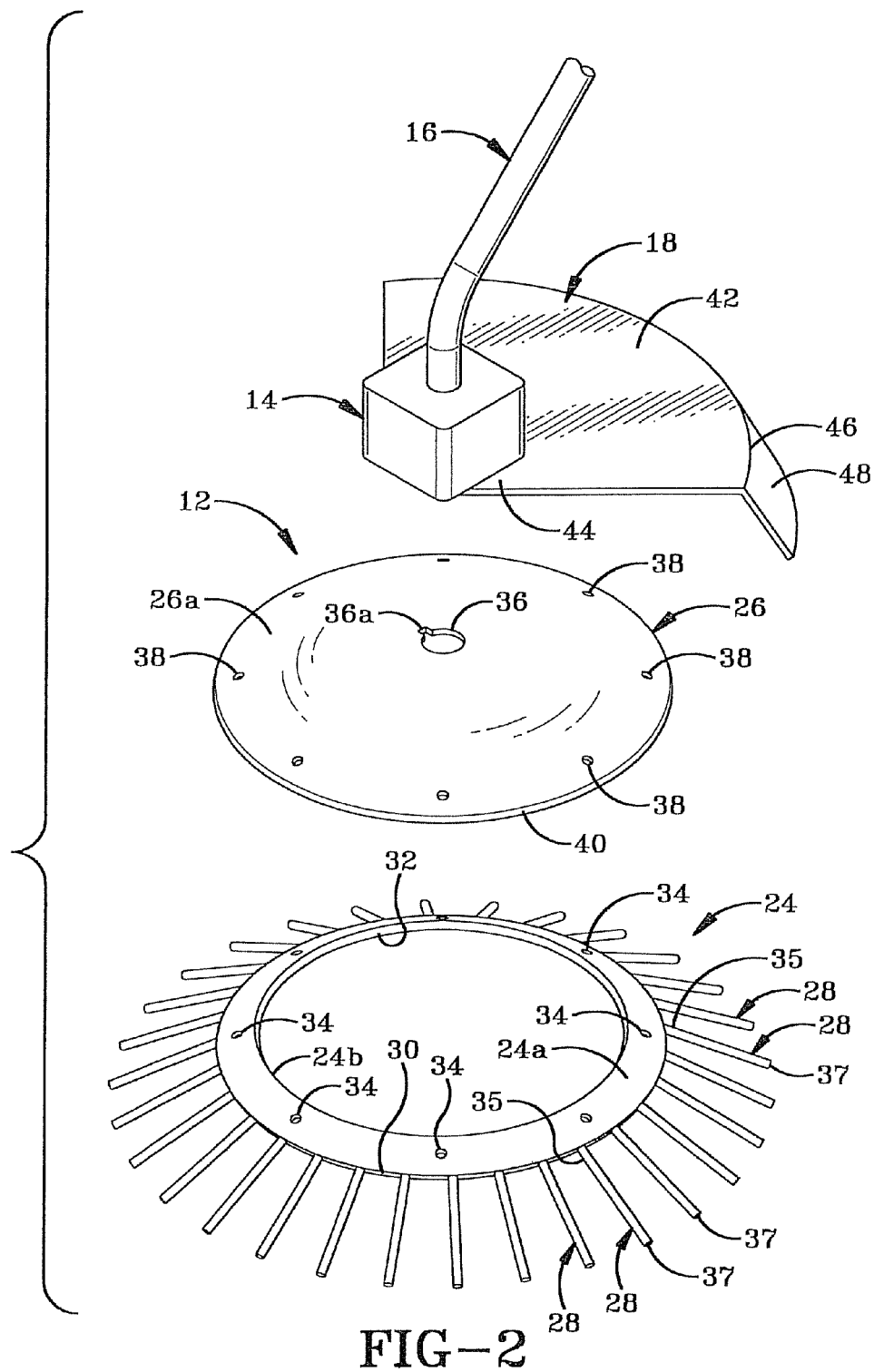
FIG. 2 is a partial exploded view of the rotatable body end of the rotary tool.
Figure 3:
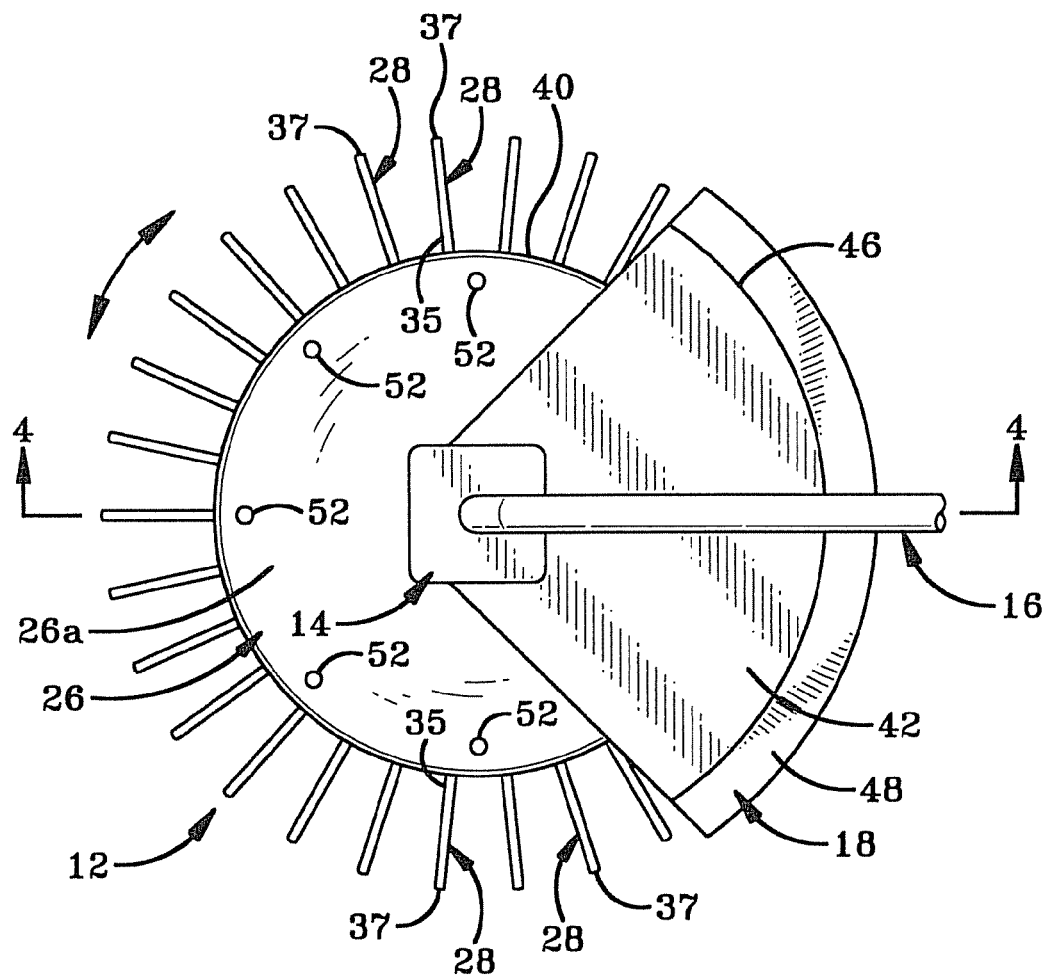
FIG. 3 is a top view of the rotary tool in which it is shown that the rotatable body can rotate in two opposing directions.
Figure 4:
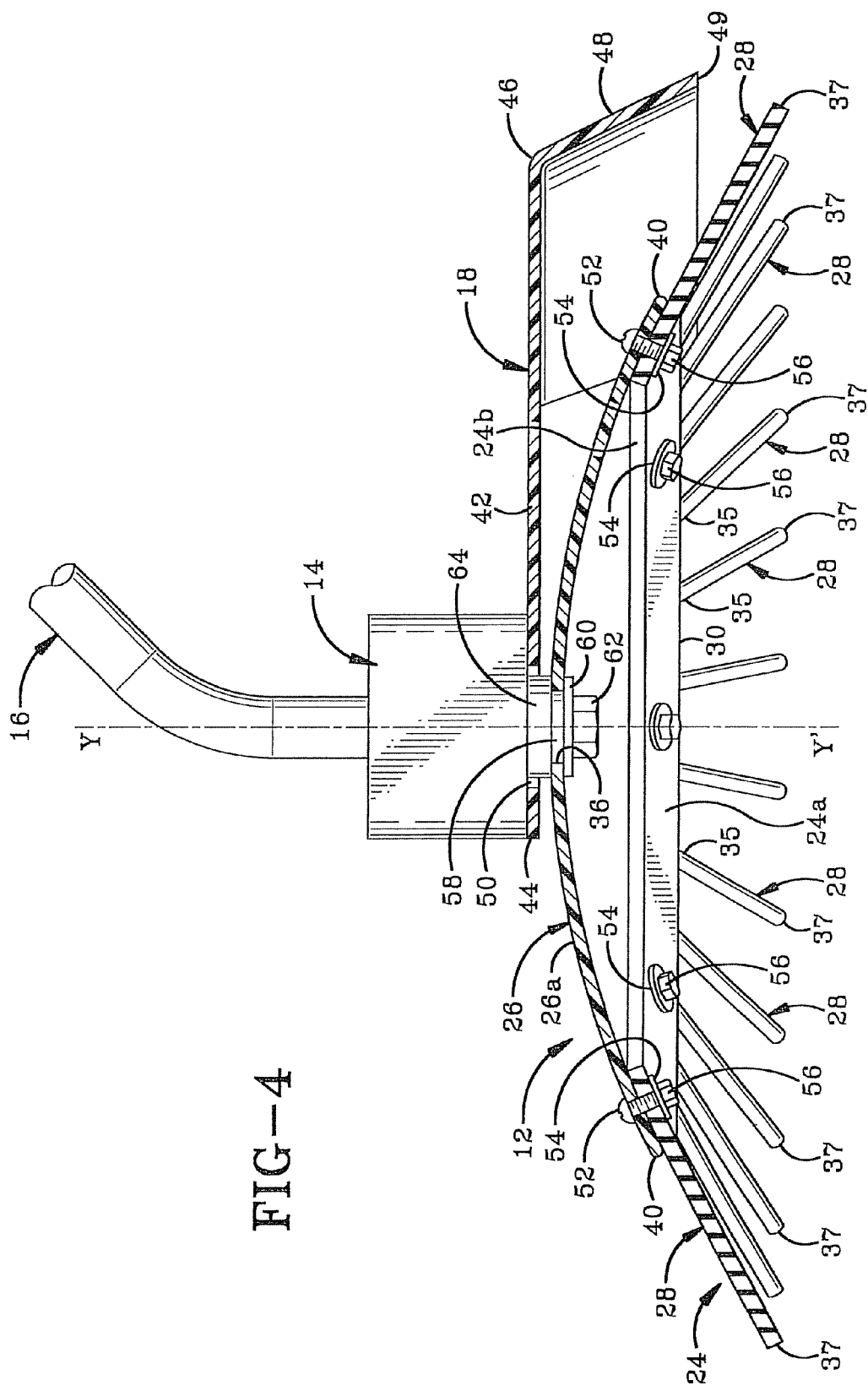
FIG. 4 is a partial cross-sectional side elevational view of the rotary tool through line 4-4 of FIG. 3.

Referring to FIGS. 2-4, a first embodiment of rotatable body 12 comprises a ring 24 and a plate 26 that are connected to stationary coupler 14. As shown in FIG. 4, body 12 is arcuate and is substantially convex in cross-sectional shape. Ring 24 comprises a wall 24a having an inner edge 24b and a peripheral edge 30. The inner edge 24b is of a first circumference and the peripheral edge 24c is of a second and larger circumference. Wall 24a slopes downwardly and outwardly away from inner edge 24b and toward peripheral edge 24c. The curvature of wall 24a is complementary to the curvature of body 12. In other words, the radius of curvature of wall 24a is complementary to the radius of curvature of body 12. This complementary relationship is best seen in FIG. 4. Ring 24 has a plurality of flexible fingers 28 radiating downwardly and outwardly from its peripheral edge 30 and has a centrally located hole 32. Fingers 28 have first ends 35 and second ends 37. First ends 35 of fingers 28 are integrally formed with ring 24 and second ends 37 are coplanar with each other and are adapted to engage the ground during operation. The second ends 37 of fingers 28 preferably lay two to three inches outwardly from peripheral edge 30. Ring 24 preferably is manufactured from a plastic or rubber that is sufficiently rigid to move the particulate materials but is flexible enough that fingers 28 can bend slightly upon entering the particulate materials and spring back to their original position, thereby flicking particulate materials away from tool 10. A plurality of apertures 34 are provided at intervals around ring 24.

Plate 26 preferably is manufactured from a more rigid plastic or rubber than is ring 24 but is still preferably slightly flexible. Plate 26 is slightly convex in shape (FIG. 4) and has a central aperture 36 therein. Central aperture 36 may be slotted as at 36a to ensure correct alignment of a drive shaft therein as hereinafter described. A plurality of apertures 38 are provided at intervals proximate the outer edge 40 of plate 26 and are positioned and spaced to align with apertures 34 on ring 24. As seen from FIG. 4, rotatable body 12 is arcuate and has a center axis Y-Y'. Stationary coupler 14 is coaxial with center axis Y-Y' and is disposed on upper surface 26a of plate 26. The diameter of ring 24 is substantially the same as the diameter of plate 26 so that outer edge 40 of plate is substantially vertically aligned with the peripheral edge 30 of ring 24. Furthermore fingers 28 radiate outwardly from arcuate plate 26 at substantially the same rate of curvature as that of plate 26.

Hood 18 is provided to partially cover ring 24 and plate 26 when rotatable body 12 is assembled. Hood 18 comprises a substantially triangular-shaped body 42 having an apex 44 and an arcuate outer edge 46. A skirt 48 extends downwardly from outer edge 46. Body 42 and skirt 48 preferably are integrally formed. Body 42 is provided with an aperture 50 proximate apex 44 through which a drive shaft 16 extends as hereinafter described.

Rotatable body 12 is assembled in the following manner. Plate 26 and ring 24 are connected together by bolts 52 inserted through aligned apertures 34, 38 in ring 24 and plate 26, respectively. Bolts 52 are secured in place with washers 54 and nuts 56. A drive shaft 58 extending outwardly from stationary coupler 14 is inserted through aperture 50 in hood 18, through aperture 36 in plate 26 and is secured in place by a washer 60 and nut 62. Drive shaft 58 is partially surrounded by a bushing 64 to prevent the rotational motion of shaft 58 from being transferred to hood 18. When rotatable body 12 is assembled, it can be seen that the outer edge 40 of plate 26 is substantially vertically aligned with the peripheral edge 30 of ring 24 (FIG. 4). Furthermore, the bottom edge 49 of skirt 48 extends below the outer edge 40 of plate 26 and edge 32 of ring 24. Furthermore, bottom edge 49 of hood 18 is positioned so that the second ends 37 of fingers 28 lie under hood 18.

Figure 5:
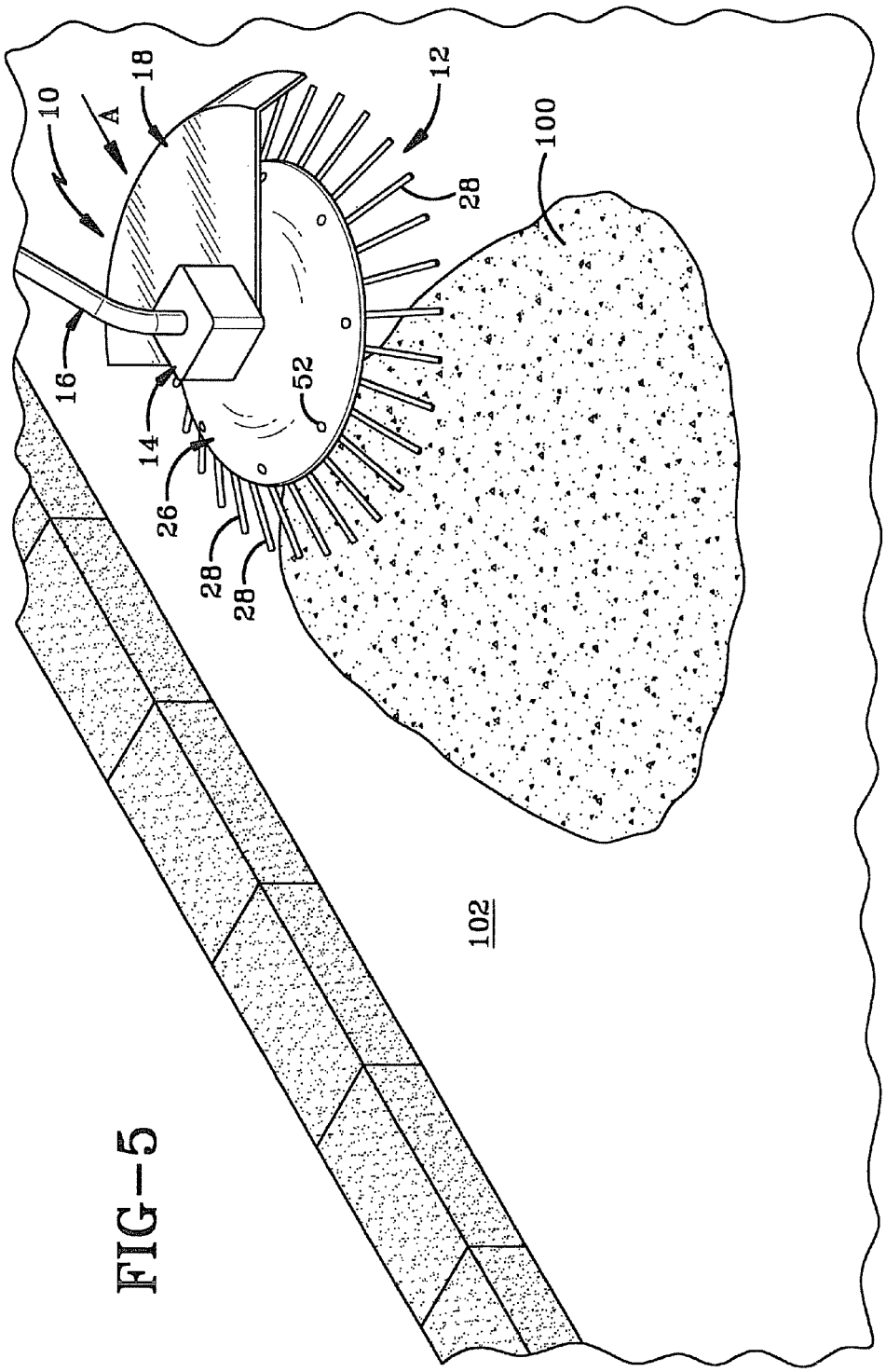
FIG. 5 is a perspective view of the rotary tool being brought into contact with a mound of particulate materials.
Figure 6:
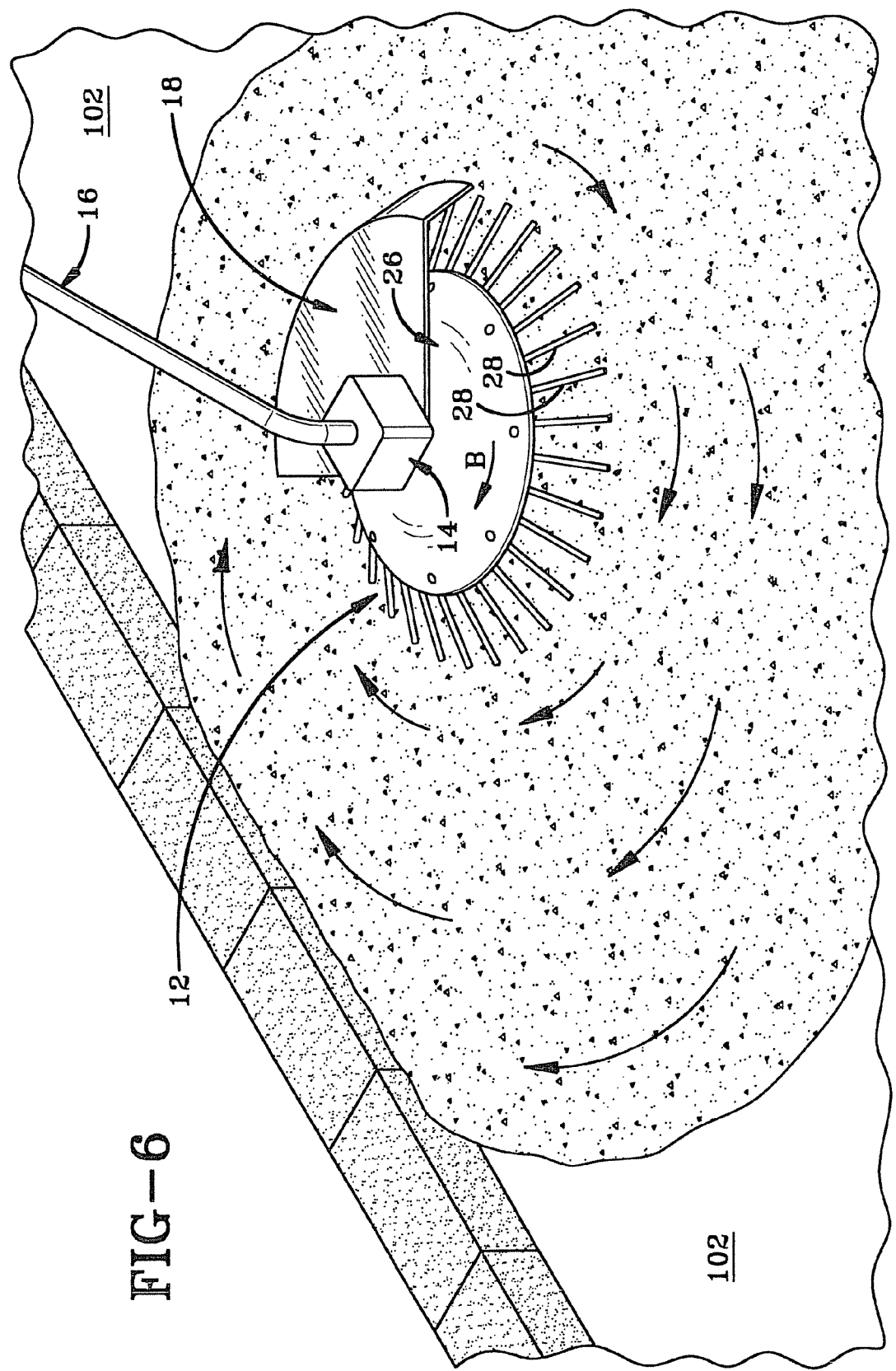
FIG. 6 is a perspective view of the rotary tool spreading a mound of particulate materials.

Referring to FIGS. 5-6, rotary tool 10 is used in the following manner. Tool 10 is moved in the direction of the arrow "A" toward a mound 100 of particulate materials piled on the flowerbed ground surface 102. Tool 10 is positioned above mound 100 and is activated so that rotatable body 12 rotates as indicated by arrow "B" (FIG. 6). Tool 10 is moved vertically downwardly into mound 100 and as fingers 28 contact the particulate materials, small pieces of material are flung radially outwardly from rotatable body 12. This causes the materials in mound 100 to be redistributed over a wider area of the ground surface 102. 18. Drive shaft 58 rotates plate 26 and consequently ring 24. Rotatable body 12 may be wired to cause drive shaft 58 to rotate plate 26 and ring 24 in either a clockwise or anticlockwise direction, or to oscillate between the two directions. Furthermore, once the initial mound 100 of particulate materials has been partially spread by the rotating body 12, the rotating body 12 may be moved laterally across ground surface 102 to further distribute the particulate material. This lateral motion may alternatively be undertaken prior to moving tool 10 vertically downwardly into mound 100. When the desired spread and thickness of particulate material has been achieved, motor 20 is switched off and the rotation of rotatable body 12 ceases.

Figure 7:
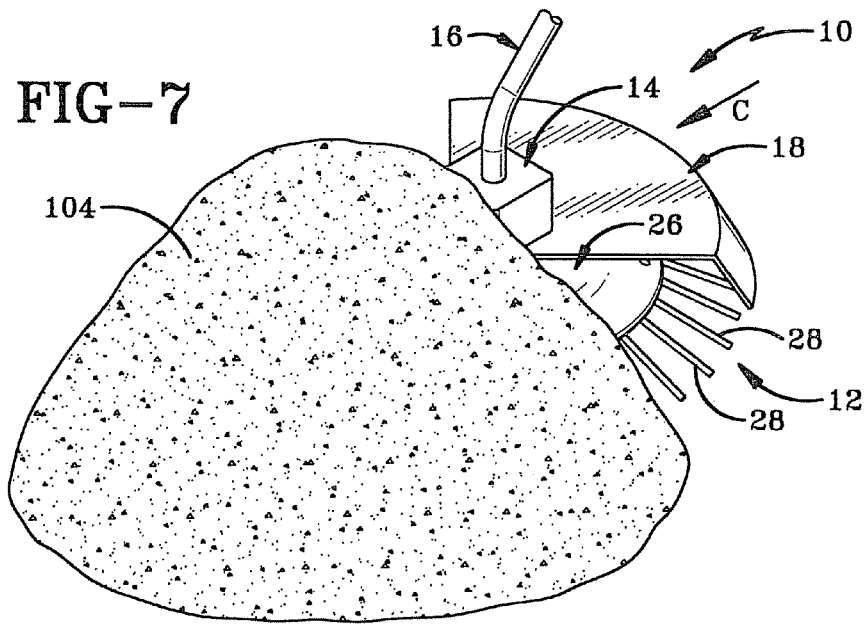
FIG. 7 is a perspective view of the rotary tool being brought into contact with a mound of particulate materials.
Figure 8:
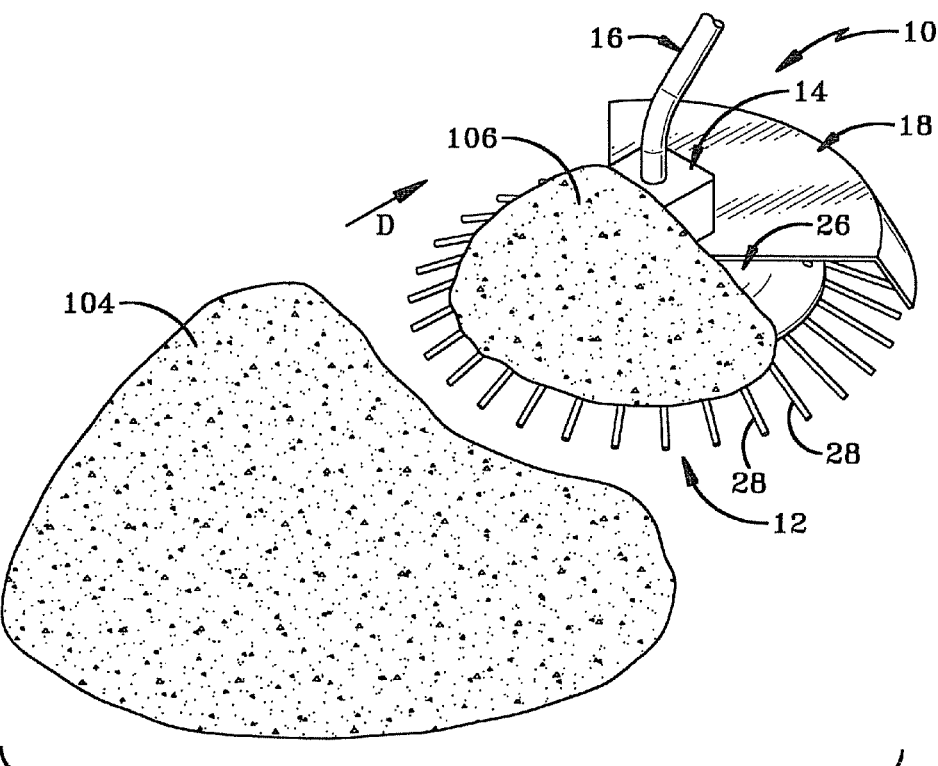
FIG. 8 is a perspective view of the rotary tool being used as a shovel to remove a portion of a mound of particulate materials.

Referring to FIGS. 7-8, rotary tool 10 may also be used to move particulate materials in the following manner. Tool 10 is moved in the direction of arrow "C" toward another mound 104 of particulate materials. Tool 10 is not activated and, consequently, there is no rotational motion of fingers 28. Tool 10 is moved in the direction of arrow "C" until a small pile 106 of particulate materials accumulates onto plate 26. Tool 10 is then withdrawn from mound 104 in the direction of arrow "D" and pile 106 of particulate materials may be carried on tool 10 over the ground surface to a remote location. When the desired remote location is reached, tool 10 is tilted so that pile 106 slides off from plate 26.

Figure 9:
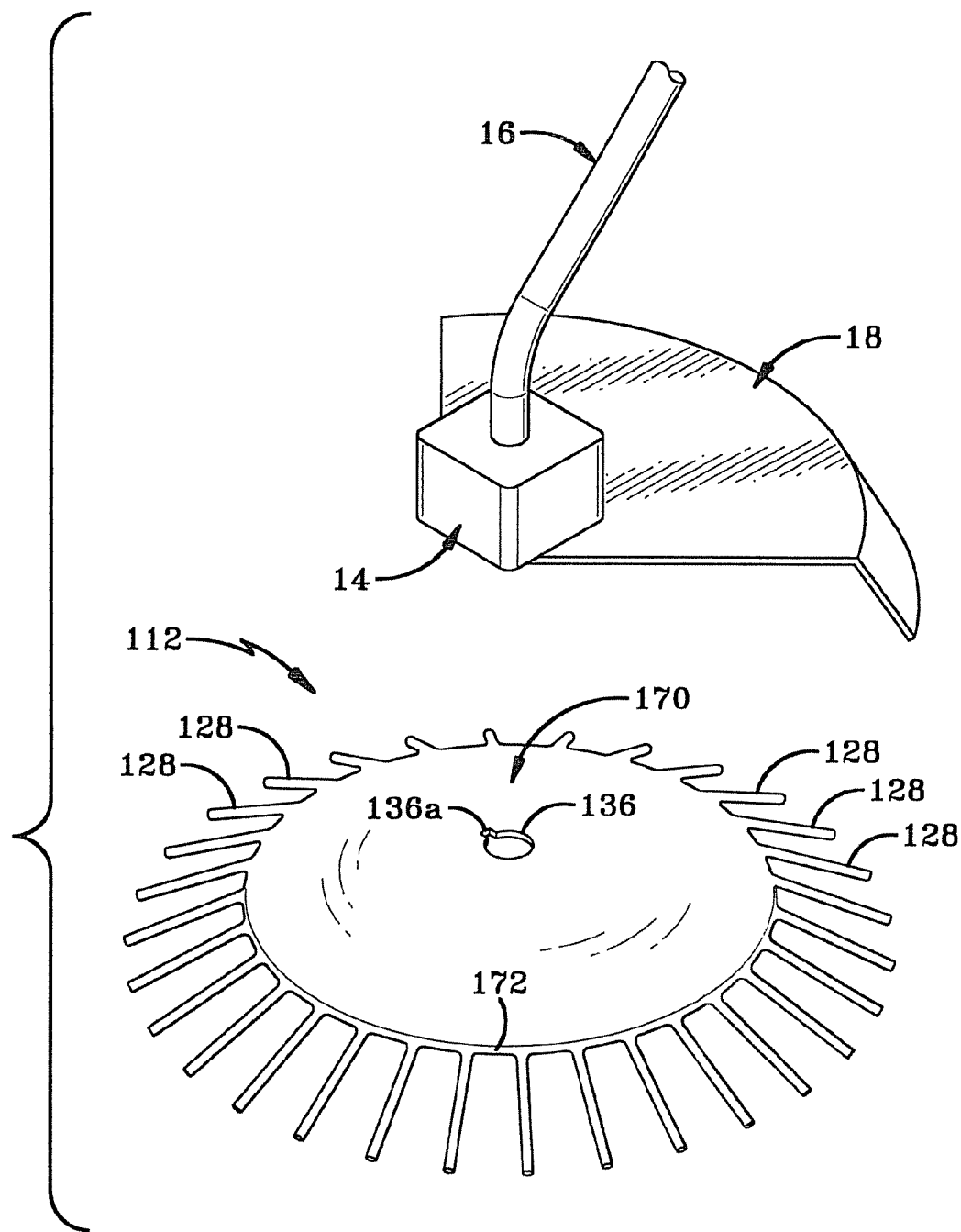
FIG. 9 is a partial exploded view of a second embodiment of the rotary tool.
Figure 10:
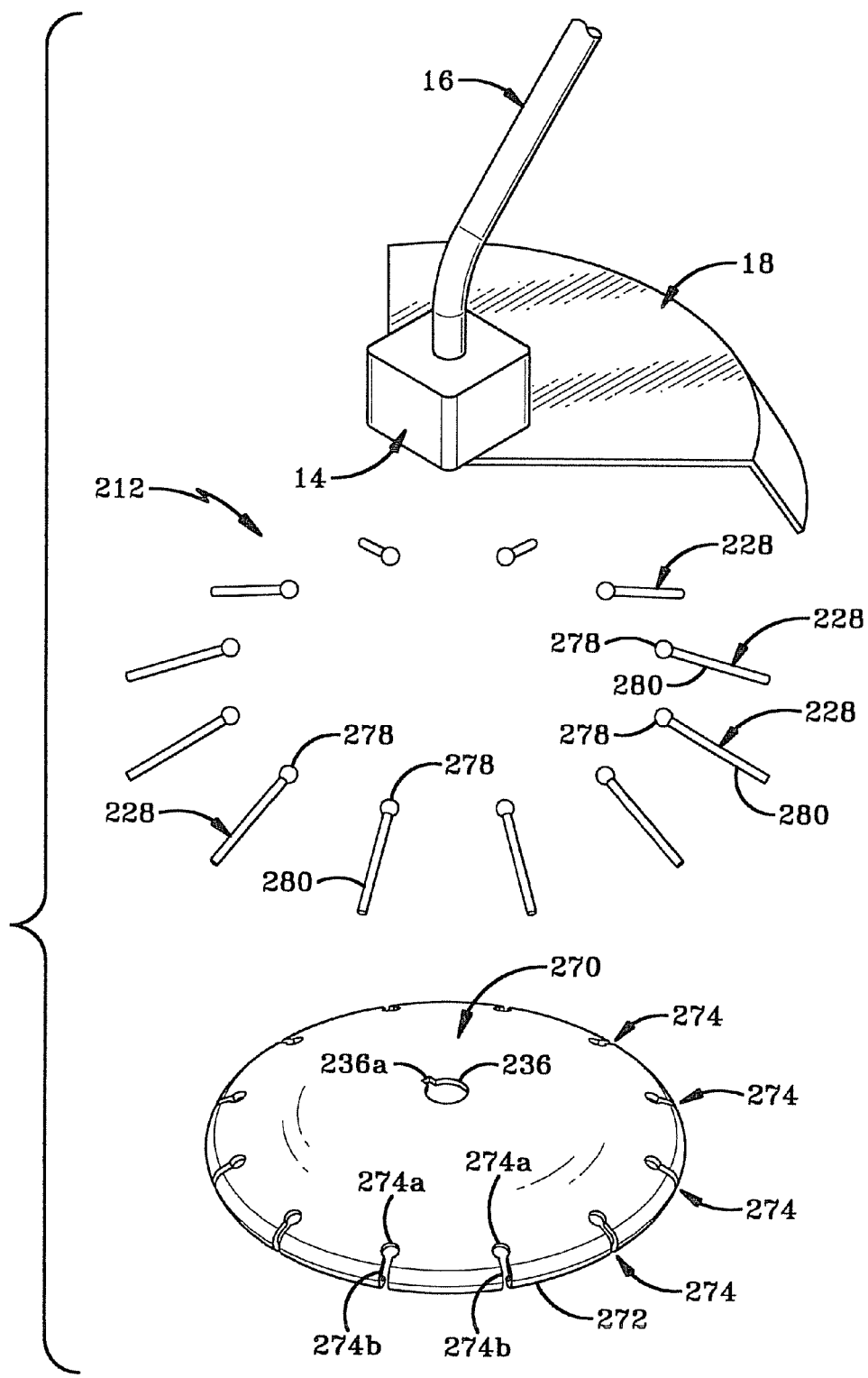
FIG. 10 is a partial exploded view of a third embodiment of the rotary tool.
Figure 11:
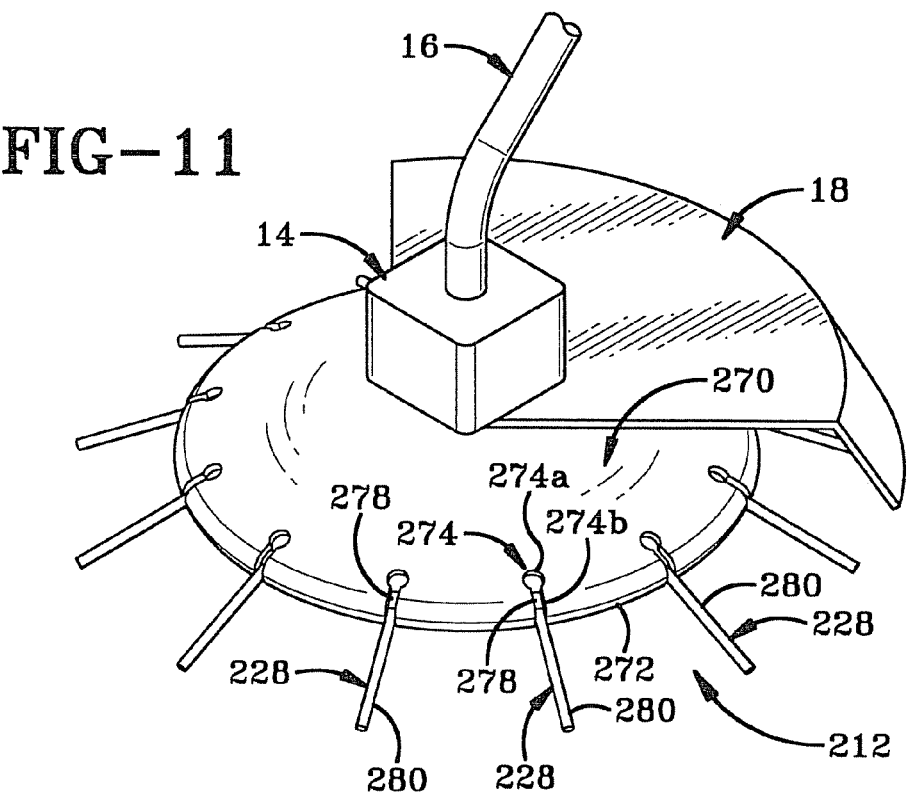
FIG. 11 is a partial perspective view of the third embodiment of the rotary tool.
Figure 12:
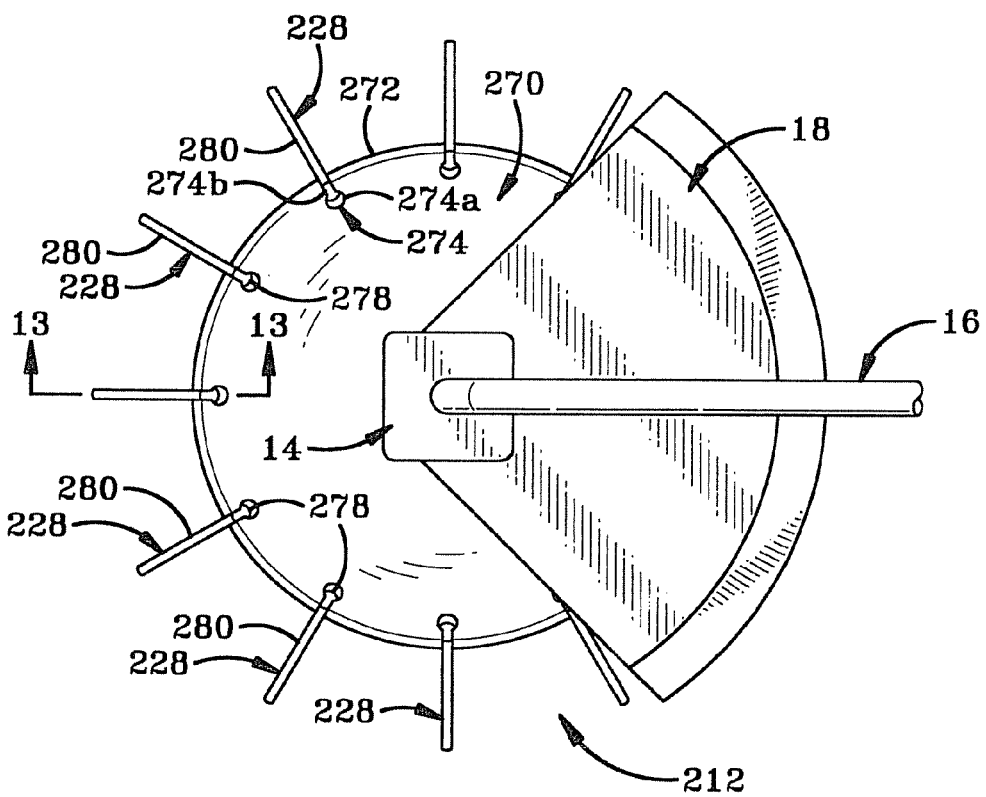
FIG. 12 is a top view of the rotary tool of FIG. 11.
Figure 13:
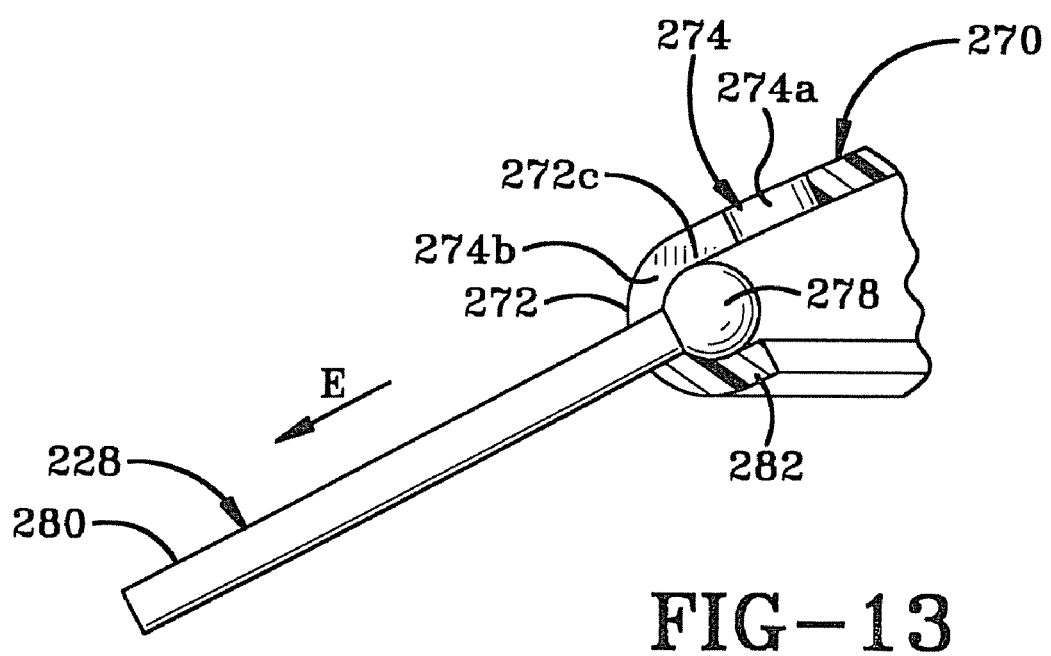
FIG. 13 is a partial cross-sectional side view of a finger of the rotary tool taken through line 13-13 of FIG. 12.

Referring to FIG. 9, there is shown a second embodiment of the rotatable body for use in association with tool 10, and generally indicated at 112. Rotatable body 112 comprises a rotatable body 170 having a convex cross-section and a centrally located aperture 136. Aperture 136 may include a slotted area 136a for correct alignment of a drive shaft (not shown) housed within stationary coupler 14 of tool 10. A plurality of fingers 128 radiate outwardly from the outer edge 172 of rotatable body 170. Rotatable body 170 preferably is manufactured from a rubber or plastic material that is strong enough to support a small amount of particulate materials thereon, but which allows fingers 128 to be flexible. Rotatable body 170 is connected to the drive shaft (not shown) extending outwardly from stationary coupler 14, through an aperture (not shown) in hood 18 and is secured thereto by a nut (not shown) as described with reference to rotatable body 12. Rotatable body 112 is used in the same manner described with reference to rotatable body 12.

Referring to FIGS. 10-13, there is shown a third embodiment of a rotatable body in accordance with the present invention and generally indicated at 212.

Rotatable body 212 comprises a convexly domed rotatable body 270 having a central aperture 236 therein. Aperture 236 may be slotted as at 236a to receive a drive shaft (not shown) therethrough. A plurality of keyhole-shaped slots 274 are formed in rotatable body 270 proximate the outer edge 272 thereof. A plurality of fingers 228 are provided for insertion into slots 274. Each finger 228 has a bulbous head 278 and an elongated shaft 280. Head 278 of each finger 228 is received in the wider portion 274a of one of slots 274 and a section of shaft 280 is received in the narrow portion 274b of the same slot 274. When head 278 of a finger 228 is inserted into wider portion 274a of one of slots 274, it is pulled radially outwardly away from the center axis of rotatable body 270 as shown by arrow "E" (FIG. 13) and locks into a seat 282 formed in outer edge 272 of rotatable body 270. Shaft 280 extends outwardly from rotatable body 270 through narrower portion 274b of slot 274. In this position, head 280 is wedged beneath a section 272c of outer edge 272 which lies between wider portion 274a of slot and seat 282. Section 272c substantially prevents finger 228 from popping out of slot 274 when rotatable body 212 is used. Rotatable body 212 is connected to stationary coupler 14 and hood 18 in the same manner as described with reference to the previous embodiments and rotatable body 212 is used in the same manner as described with reference to the previous embodiments. The configuration of rotatable body 212 allows individual fingers to be replaced if they are damaged by simply removing the damaged component and replacing it with an undamaged component.

While it has been disclosed that ring 24, plate 26 and rotatable bodies 170 and 270 are manufactured from rubber or plastic, it will be understood that these components could be manufactured from a suitable metal or composite material, without departing from the spirit of the present invention. Furthermore, while plate 26, rotatable body 170 and rotatable body 270 have been shown and described as convex in cross-section, it will be understood that the plate or rotatable body could be substantially flat or concave in cross-section, without departing from the spirit of the present invention. Furthermore, while the rotatable bodies 170 and 270 and plate 26 have been shown and described as generally circular in shape, these components could be formed in other shapes, such as an ellipse or triangle, without departing from the spirit of the present invention. Additionally, the rotatable body could be mounted on the end of a weed trimmer or other type of presently known tool.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A rotary tool for spreading a pile of mulch; said tool comprising:
   a body having an upper surface and a lower surface, wherein the body is substantially circular when viewed from the top and is convex in cross-sectional shape; wherein the upper surface has a peripheral edge disposed a radial distance away from a center axis of the body and the body is rotatable about the center axis; and wherein an annular region of the peripheral edge curves inwardly for a short distance beneath the lower surface of the body to form an annular seat between the lower surface and the annular region;
   a plurality of apertures defined in the upper surface adjacent the peripheral edge;
   a plurality of flexible fingers, each finger being individually detachably engaged in one of the apertures such that a first end of the finger is received in the aperture and the finger extends radially outwardly from the aperture and beyond the peripheral edge of the body terminating in a second end; and wherein the second ends of the plurality of fingers are positioned a distance beneath the lower surface of the body; and wherein the body and the fingers engage and spread mulch outwardly from the pile in a 360-degree-spread pattern when the body is rotated.

2. The rotary tool as defined in claim 1, wherein each finger includes an elongated shaft that extends between the first and second ends thereof; and when the finger is engaged in one of the apertures in the body, the shaft extends radially outwardly from the body and is oriented at substantially at the same rate of curvature as the upper surface of the body.

3. The rotary tool as defined in claim 1, wherein the first end of each finger comprises a bulbous head, and the bulbous head is received into one of the apertures in the upper surface and rests in the annular seat.

4. The rotary tool as defined in claim 3, wherein each aperture is keyhole-shaped having a wider region and a narrower region; and the bulbous head is complementary to the wider region and is received therein.

5. The rotary tool as defined in claim 4, wherein each finger includes an elongated shaft that extends between the first and second ends thereof; and when the finger is engaged in one of the apertures in the body, the shaft extends radially outwardly from the body through the narrower region of the aperture.

6. The rotary tool as defined in claim 1, wherein the fingers are sufficiently rigid enough to be able to lift and distribute mulch particles from the pile when the body is rotated but are also sufficiently flexible enough so as not to substantially reduce the size of the mulch particles when they engage the same.

* * * * *